Sept. 11, 1923.

T. R. COOK

STORAGE BATTERY

Filed Jan. 16, 1922

1,467,707

INVENTOR:
T. R. Cook,
BY A. L. Vencill
his ATTORNEY

Patented Sept. 11, 1923.

1,467,707

UNITED STATES PATENT OFFICE.

THOMAS R. COOK, OF PITTSBURGH, PENNSYLVANIA, ASSIGNOR TO THE WESTINGHOUSE UNION BATTERY COMPANY, OF SWISSVALE, PENNSYLVANIA, A CORPORATION OF PENNSYLVANIA.

STORAGE BATTERY.

Application filed January 16, 1922. Serial No. 529,757.

*To all whom it may concern:*

Be it known that I, THOMAS R. COOK, a citizen of the United States, residing at Pittsburgh, in the county of Allegheny and State of Pennsylvania, have invented certain new and useful Improvements in Storage Batteries, of which the following is a specification.

My invention relates to storage batteries, and has for an object the provision of novel and improved means for facilitating the circulation of the electrolyte in such batteries.

Figure 1:
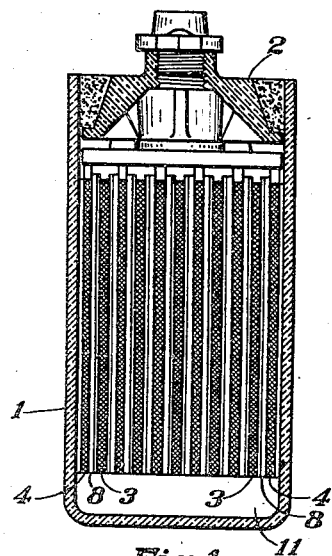
Figure 2:
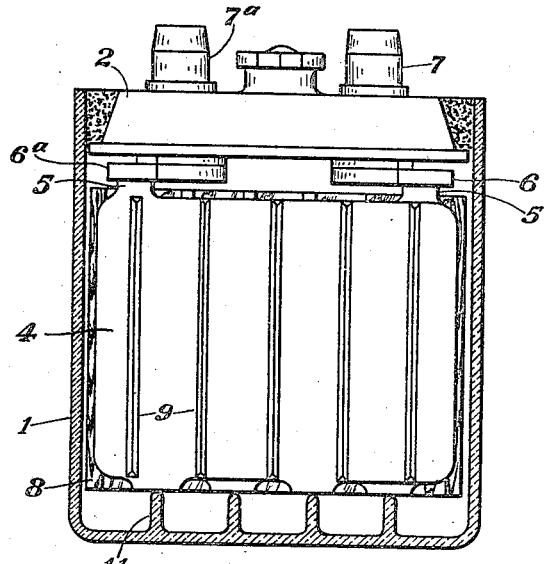
Figure 3:
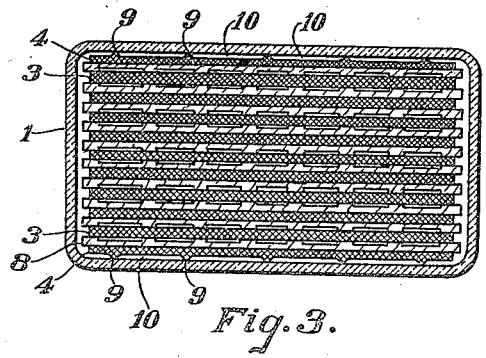

I will describe one form of battery embodying my invention, and will then point out the novel features thereof in claims:

In the accompanying drawings, Fig. 1 is a view showing in vertical section one form of storage battery embodying my invention the view being taken on a plane perpendicular to the planes of the plates and separators. Fig. 2 is a vertical sectional view of the battery shown in Fig. 1 but taken on a plane parallel to the planes of the plates and separators, and looking at the outer surface of one of the outside plates of the battery. Fig. 3 is a horizontal sectional view of the battery shown in Figs. 1 and 2.

Similar reference characters refer to similar parts in each of the several views.

Referring now to the drawings, the reference character 1 designates a jar which is provided as usual with a cell cover 2. Located within the jar 1 are the usual positive plates 3, negative plates 4, separators 8, and the liquid electrolyte, all in accordance with usual and standard storage battery practice. The plates and separators are supported in part by plate rests 11 in the form of ribs at the bottom of the jar, so that space is provided below the plates for the horizontal movement of electrolyte. The electrolyte extends above the plates as usual, thereby permitting horizontal movement of the electrolyte at this point also. The upper end of each plate is provided with a lug 5, and all of the lugs on the positive plates are attached to one connecting strap 6, while all of the lugs on the negative plates are attached to a similar connecting strap 6ª. Extending upwardly from the connecting strap 6 is a terminal post 7, while extending upwardly from the connecting strap 6ª is a similar terminal post 7ª, both of which posts project through suitable holes in the cell cover 2.

The outer surface of at least one of the outside plates is provided with vertical ribs 9, as shown in Figs. 2 and 3, which ribs form vertical passage ways 10 for the downward flow of the electrolyte between such plate and the adjacent wall of the jar 1. As here shown, both outside negative plates are provided with these ribs, although they may be omitted from one plate if desired.

While a storage battery is being charged, the electrolyte becomes heated due to action between the positive and negative plates, and at the same time oxygen and hydrogen gas are formed in the electrolyte. Both the heating and the generation of gas tend to cause an upward movement of the electrolyte between the plates and separators, and this movement is not seriously impeded because of the looseness of the separators between the plates, and also because vertical passageways are usually provided between the separators and the plates for the express purpose of facilitating such movement. The return movement or downward flow of electrolyte is not ordinarily provided for, however, but in accordance with my invention it will be noted that such return movement takes place freely owing to the vertical grooves 10 between the ribs 9 and the adjacent wall of the battery cell 1.

One important feature of my invention is that I provide for this return or downward flow of the electrolyte with the minimum reduction in the available space for the battery element, that is, for the plates and separators. In other words, I provide for such flow with the minimum reduction in capacity for a given size of battery jar.

Although I have herein shown and described only one form of storage battery embodying my invention, it is understood that various changes and modifications may be made therein within the scope of the appended claims without departing from the spirit and scope of my invention.

Having thus described my invention, what I claim is:

1. A storage battery comprising a jar containing positive and negative plates, and a liquid electrolyte, the outside surface of at least one of the outside plates being provided with vertical ribs which form vertical passageways for the downward flow of electrolyte between such plate and the adjacent wall of the jar, the inside plates not being provided with such ribs.

2. A storage battery comprising a jar containing positive and negative plates and a liquid electrolyte, the outside surface of an outside negative plate being provided with vertical ribs which form vertical passageways for the downward flow of electrolyte between such plate and the adjacent wall of the jar, the inside plates not being provided with such ribs.

THOMAS R. COOK.